United States Patent [19]

Whelan

[11] Patent Number: 5,518,227
[45] Date of Patent: May 21, 1996

[54] ELASTOMERIC MOUNTING

[75] Inventor: James M. Whelan, Leicester, Great Britain

[73] Assignee: Dunlop Limited, a British Company, United Kingdom

[21] Appl. No.: 211,712

[22] PCT Filed: Oct. 22, 1992

[86] PCT No.: PCT/GB92/01944

§ 371 Date: Jun. 21, 1994

§ 102(e) Date: Jun. 21, 1994

[87] PCT Pub. No.: WO93/08413

PCT Pub. Date: Apr. 29, 1993

[30] Foreign Application Priority Data

Oct. 22, 1991 [GB] United Kingdom .............. 9122382

[51] Int. Cl.[6] .................. F16F 1/42; F16F 1/36; B61F 5/00
[52] U.S. Cl. .................. 267/153; 267/292; 248/633; 105/453
[58] Field of Search .................. 267/294, 3, 292, 267/140, 141.4, 153, 141; 248/609, 615, 633, 635; 105/453

[56] References Cited

U.S. PATENT DOCUMENTS

| 2,783,959 | 3/1957 | Boschi et al. .................. 267/140.3 |
| 3,584,858 | 6/1971 | Beck .................. 267/153 |
| 4,781,365 | 11/1988 | Harrison .................. 267/294 |
| 5,246,214 | 9/1993 | Wolf et al. .................. 248/638 X |
| 5,310,276 | 5/1994 | Bergers et al. .................. 267/141 X |

FOREIGN PATENT DOCUMENTS

| 440925 | 1/1936 | United Kingdom .................. 267/294 |
| 1333308 | 10/1973 | United Kingdom . |
| 2084693 | 4/1982 | United Kingdom . |
| 2156946 | 10/1985 | United Kingdom . |
| 2156947 | 10/1985 | United Kingdom . |

*Primary Examiner*—Josie Ballato
*Attorney, Agent, or Firm*—Stevens, Davis, Miller & Mosher

[57] ABSTRACT

An elastomeric mounting comprises a body of elastomeric material having end regions the surfaces which are bonded to respective confronting surfaces of a pair of rigid end members for compression therebetween. A first of the rigid end members (32) extends radially outwardly from a longitudinal compression axis (19) of the mounting to lie beyond the bonded interface (35). The first end member has outwards of the bonded interface an abutment face (34) which is contacted by the elastomeric body when subject to compression loading, and a discontinuity is defined by the first rigid end member whereby the interface and abutment face depart from a wholly co-planar form.

20 Claims, 4 Drawing Sheets

5,518,227

ELASTOMERIC MOUNTING

BACKGROUND OF THE INVENTION

This invention relates to an elastomeric mounting of the kind comprising a body of elastomeric material having an end portion bonded to a substantially rigid end member against which the elastomeric material comes into increasing contact when subject to compression load.

The invention relates in particular, though not exclusively, to an elastomeric mounting of the kind comprising a body of elastomeric material located between and bonded to a pair of rigid end members at least one of which is arranged such that the elastomeric material comes into increasing contact therewith when subject to compression loads. An example of an elastomeric mounting of this kind and of a type adapted for high performance, heavy duty applications is described and claimed in the specification of assignee's UK Patent No. 2156947. As compared with a simple elastomeric bush having a cylindrical body of elastomeric material, the elastomeric body of the mounting of GB 2156947 differs notably in that the outer surface is of a non cylindrical circular section profile with the outer diameter of the bonded area at one end being significantly greater than at the other end.

The invention also relates in particular, though not exclusively, to an elastomeric mounting having a pair of end zones the surfaces of which are bonded to respective confronting surfaces of a pair of rigid end members for compression therebetween, with at least one of said rigid end members extending radially outwardly from a longitudinal compression axis of the mounting to beyond the bonded interface and with said at least one end being an end at which the bonded area extends radially outwards for further than the bonded area at the other end. The elastomeric mounting may be of a kind adapted for use in a high dynamic loading application, such as the suspension of a rail freight vehicle.

SUMMARY OF THE INVENTION

The present invention seeks to provide an elastomeric mounting, for example of a type such as desribed above with reference to GB 2156947 or as described in the preceding paragraph, which has a good dynamic load capability.

In accordance with one of its aspects the present invention provides an elastomeric mounting comprising a body of elastomeric material having end zones the surfaces of which are bonded to respective confronting surfaces of a pair of rigid end members for compression therebetween, at least a first of said rigid end members extending radially outwardly from a longitudinal compression axis of the mounting to lie beyond the bonded interface, said first rigid end member having outwards of the bonded interface an abutment face which is contacted by the elastomeric body when subject to compression loading, the first rigid end member defining a discontinuity whereby the interface and abutment face depart from a wholly co-planar form, the body of elastomeric material being substantially hollow in the vicinity of the first of said end regions and substantially solid in the vicinity of the second of said end regions and the bonded interface at said first member extending radially outwards for further than the bonded area at the other end of the mounting.

The bonded interface of the first end member may be substantially planar and may extend in a plane substantially perpendicular to said longitudinal compression axis.

The discontinuity may be provided substantially adjacent to the bonded interface portion of the end member or radially outwards of the radially outer extremity of that bonded interface. The discontinuity may be provided in a substantially planar bonded interface.

The discontinuity preferably is of a substantially smooth form whereby it does not present a stress concentration point or tear initiation zone to contacting elastomeric material of the body when under compression.

The discontinuity may comprise a depression in the abutment zone or, more preferably, between the abutment zone and bonded interface. Alternatively or additionally it may comprise a raised region whereby at least a part of the abutment zone lies axially closer to the other end member of the elastomeric mounting than the bonded interface.

Preferably, as considered relative to a median plane lying perpendicular to the longitudinal compression axis, midway between the ends of the mounting, at least a part of the body of elastomeric material at an end zone adjacent a first of the rigid end members lies further from said median plane than said abutment face.

The body of asymmetric form may have an asymmetric form corresponding or substantially similar to any of the forms described in the specification of GB 2156947.

The first rigid end member may be of a unitary construction or of two or more components secured relative to one another. In particular the rigid end member may comprise a first portion which defines the abutment face and a second portion which defines a surface of the bonded interface.

It is not essential that the first rigid end member be in the form of a plate or like member bonded to the elastomeric body. In an alternative the first rigid and member may be comprised wholly or in part by structure which supports or is supported by the elastomeric body and the invention further provides an assembly installation comprising support structure and the elastomeric mounting of the invention in which the support structure defines at least in part said first rigid and member.

The rigid end members may be comprised by plates or other rigid components of metal, or plastics or composite material such as carbon composite material. The abutment face of the first rigid end member and any abutment face of the other end member may have a coating of low friction and/or resilient material. The coating may be of an elastomeric material which may be of a type similar to that which forms the elastomeric body of the mounting.

The invention envisages that the elastomeric body shall be of a kind substantially symmetrical in shape as considered in cross-section about said longitudinal axis and that the body shall be of progressively increasing external cross-section through a second part of its length extending from said other end and of progressively decreasing external cross-section dimension over a first part of its length extending to said first end region.

The second part of said progressively increasing diameter may occupy at least 50% and preferably between 60% and 90% of the length of the body from the second to the first of said opposed end regions as considered in said longitudinal direction.

That part of the body of elastomeric material which is substantially solid may incorporate a vent passage for flow of fluid to or from the hollow zone. The body preferably is substantially hollow over at least 10% and preferably less than 80% of the length as considered in said longitudinal direction. Preferably the body is substantially hollow over at least 30% and more preferably between 40% and 70% of the length of the body in said longitudinal direction.

The maximum external dimension of the elastomeric body perpendicular to the longitudinal direction may be at a position where the cross-section of the body is annular, i e at a hollow portion.

Preferably, as considered in a plane containing the longitudinal axis of the body, the external profile of a body is curved over both the first and second parts of its length. Thus as considered in said plane the external shape is convex.

The bonding of the elastomeric body to the rigid end members may arise by virtue of a rubber to metal hot bonding process in a manner well known to those skilled in the art, or by the use of adhesives or by co-operation between for example a reinforcing component embedded in an end zone of the elastomeric body and structure forming a rigid end member.

BRIEF DESCRIPTION OF THE DRAWINGS

Embodiments of the present invention will now be described by way of example only, with reference to the accompanying diagrammatic drawings in which.

DETAILED DESCRIPTION OF PREFERRED EMBODIMENTS

Figure 1:
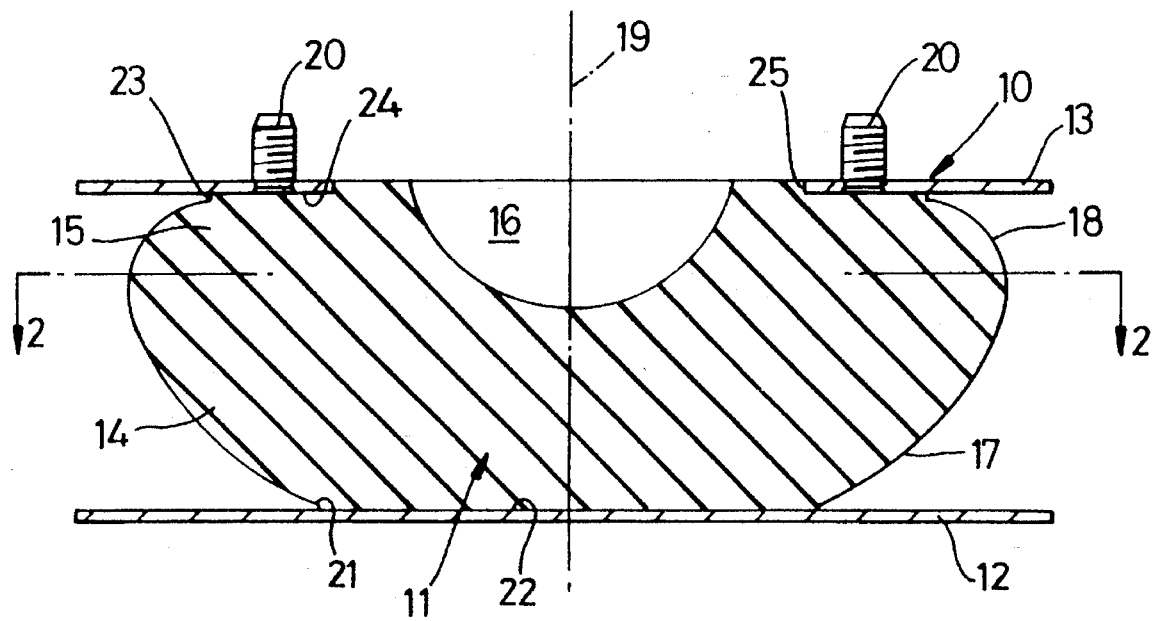
FIG. 1 is a sectional view of a prior art elastomeric mounting.

An elastomeric mounting 10 of known construction comprises a body 11 of elastomeric material of generally circular cross-sectional shape and located between and bonded to metal end plates 12, 13.

The body 11 comprises a second part 14 of progressively increasing diameter as considered in a direction from a lower, second of the end plates, plate 12, and over the remaining first part 15 of the body is of progressively decreasing diameter to the upper, first plate 13. The body 11 is symmetrical about the longitudinal axis 19 which lies parallel with the normal direction of compression loading of the mounting.

Figure 2:
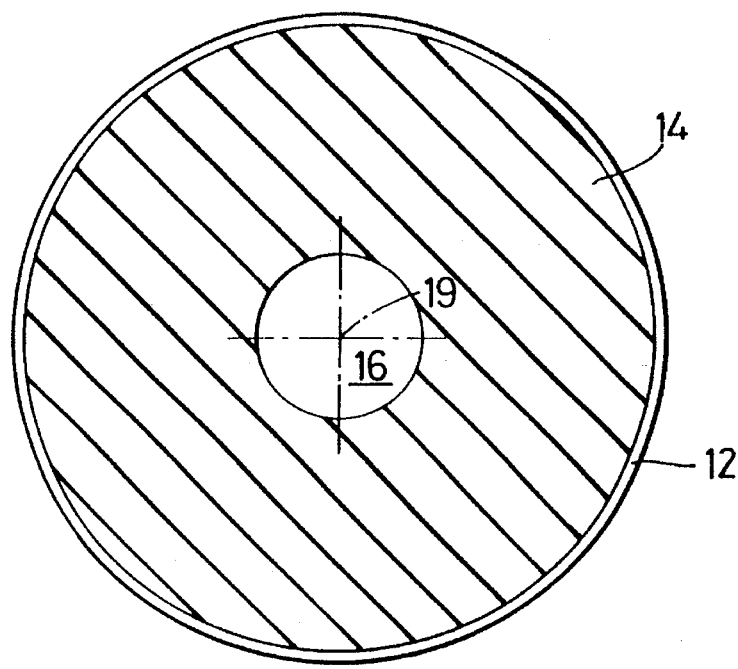
FIG. 2 is a cross-section view on the line 2—2 of FIG. 1.

The first part 15 and a part of the second part 14 of the body are annular in cross-section as shown in FIG. 2 and defined within the body a cavity 16. The cavity is of U-shape as viewed in cross-section in the plane of FIG. 1 and extends from the first plate 13 for approximately 40% of the distance by which the two end plates are spaced apart.

The cross-sectional view of FIG. 2 is taken in a transverse plane between the first and second parts 14, 15, i e at a plane of maximum external diameter. Said plane lies at a distance from the second end plate 12 approximately 70% of the distance by which the plates are separated.

The second plate 12 is in the form of a disc but the first plate 13 is annular thereby to permit a free flow of air to and from the cavity 16. The upper, first plate 13 is provided with location means such as bolts 20.

The two end plates 12, 13 are of substantially similar external diameter and which diameter corresponds approximately with the maximum external diameter of the body 11. The maximum radial extent 21 of the bonded interface 22 between the body 11 and the lower, second plate 12 lies inwards of the radially outer boundary 23 of the bonded interface 24 between the body 11 and the first, upper plate 13 and is substantially equal to the inner diameter of the upper plate aperture 25.

The external convex curved surfaces 17, 18 of the first and second body parts as viewed in FIG. 1 combined with the difference in radial extent of the bonded interfaces 22, 24 results, in this embodiment of the invention, in the external surface 18 of the first part 15 of the spring tending to move into substantial contact with the first plate 13 prior to contact between the external surface 17 of the lower part against the lower, second plate 12. In consequence the first plate presents a much greater restraint on deformation of the elastomeric body when subject to compression load.

Figure 3:
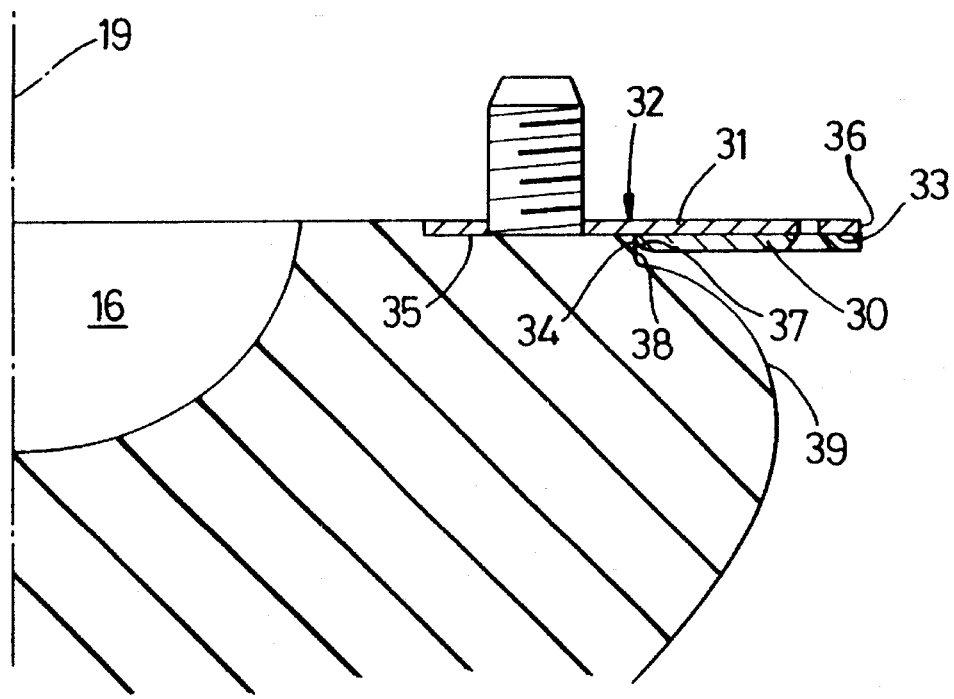
FIG. 3 corresponds substantially with that of FIG. 1 but shows part of a mounting in accordance with the present invention, and FIGS. 4 to 7 correspond with FIG. 3 but show other embodiments of the invention, with FIG. 5(a) being an enlargement of the encircled portion of FIG. 5.

In accordance with one embodiment of the present invention shown in FIG. 3 it is provided that an annular abutment plate 30 shall be secured to (or formed integrally with) a radially outer portion 31 of the first end plate 32 at the side 33 whereof which confronts the lower plate. The abutment plate extends radially from the outer extremity 34 of the bonded interface 35 between the upper plate and body to align with the radially outer edge 36 of the first plate 32.

The radially inner edge of the abutment plate has a rounded profile 37 and the elastomeric body is profiled at that point to provide a step formation 38 whereby the convex external surface 39 of the first portion of the spring lies slightly spaced from that curved inner edge 37 when the mounting is in an unloaded condition. Instead of a step formation the elastomeric body may be profiled to follow the curvature of profile 37, either in contact therewith or spaced therefrom.

Figure 4:
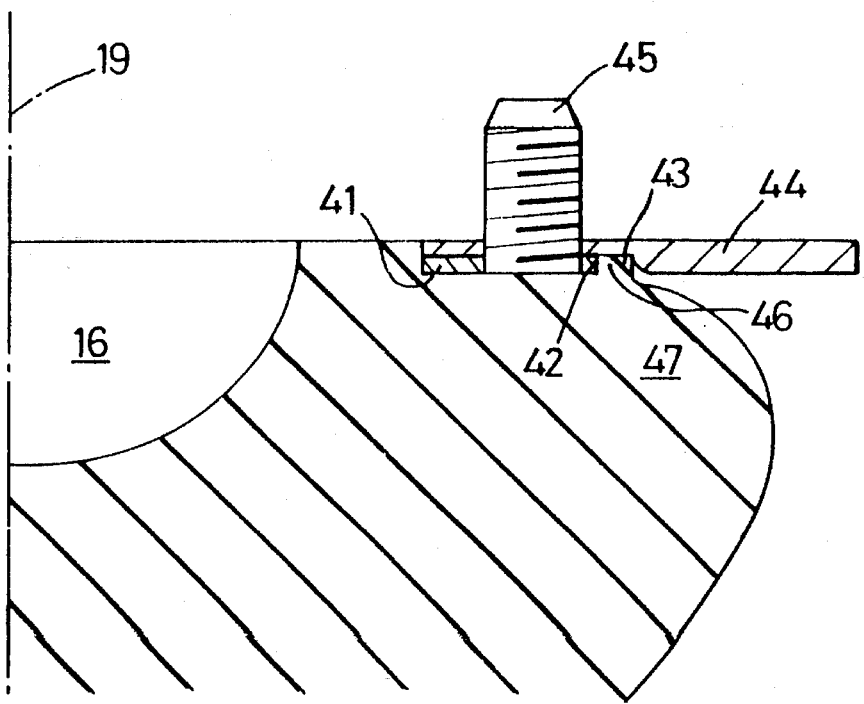

FIG. 4 illustrates an embodiment in which a bonded first plate 41 is of a limited radial extent and has an outer edge 42 which lies radially inwards of the upper end face 43 of the elastomeric body. This plate supports an abutment plate 44 which is located relative thereto by means of the location studs or bolts 45 of the first plate being arranged to extend through apertures in the abutment plate.

The overall cross-sectional profile of the abutment plate 44 corresponds substantially with the combined cross-sectional profile of the first and abutment plates shown in FIG. 3. However by virtue of providing a first plate 41 of smaller outer diameter and arranging for that to support an abutment plate there is defined an annular recess 46 which in this embodiment is filled with elastomeric material of the body portion 47.

The abutment plate 44 may be assembled with the first plate 41 prior to rubber to metal bonding of the elastomeric material to the first plate, in which case the body may be caused to bond also to the surfaces of the abutment plate which define that recess 46. Alternatively the abutment plate may be provided subsequent to bonding of the first plate of the body and the elastomeric material may be unbonded to the abutment plate.

Figure 5A:
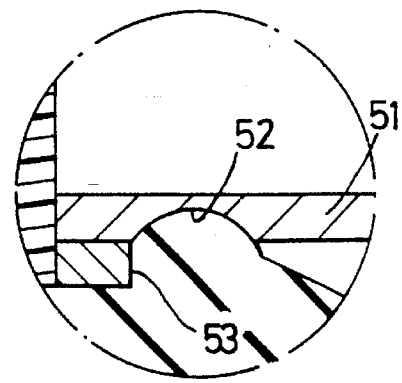
Figure 5:
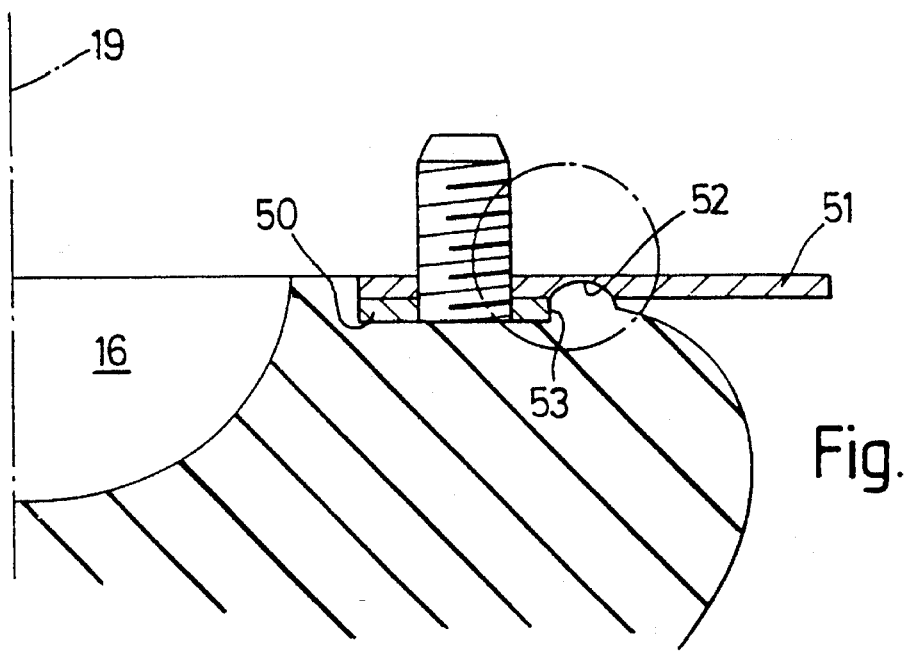

FIG. 5 illustrates an embodiment comprising a first plate 50 similar to that shown in FIG. 4 and having located relative thereto an abutment plate 51 which differs from that of FIG. 4 in that it is of a uniform thickness apart from being formed with an annular depression 52 proximate the radially outer 53 edge of the first plate. The rubber material of the elastomeric body is arranged to extend into the annular depression 52.

Figure 6:
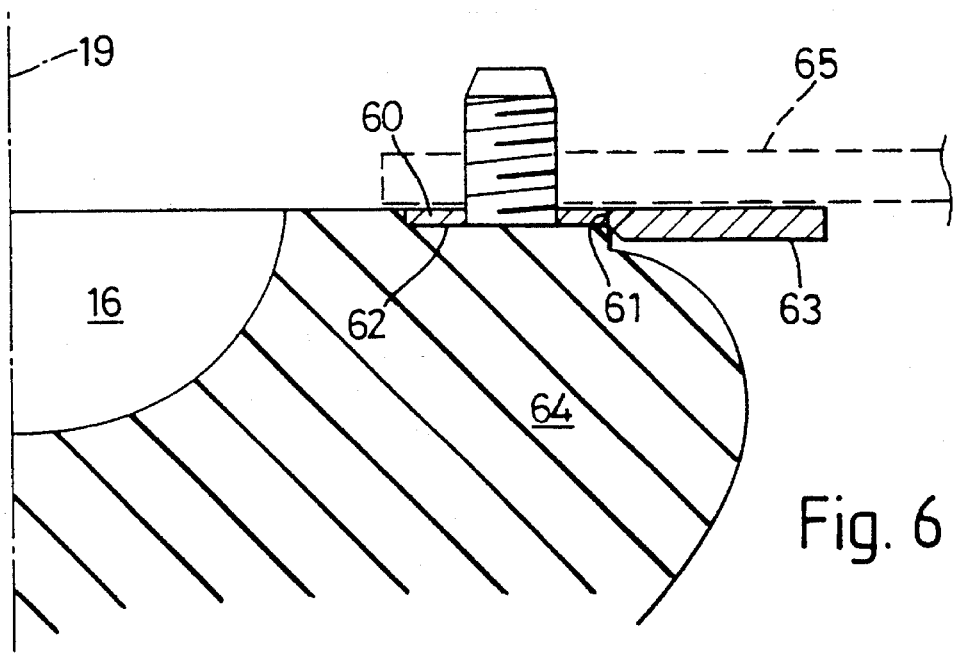

FIG. 6 illustrates an embodiment similar to that of FIG. 3 but in which a first end plate 60 is of limited radial extent and terminates at a radially outer position 61 coincident with the radially outer extremity of the bonded interface 62 with the elastomeric body. The abutment plate 63 extends radially outwards from that extremity of the bonded interface 62. In this embodiment resistance to movement of the abutment plate 63 in an axial direction and the forces arising during compression of elastomeric body 64 and deformation against the abutment plate 63 is resisted by support structure 65 as shown schematically in FIG. 6 to which the first plate is secured.

Figure 7:
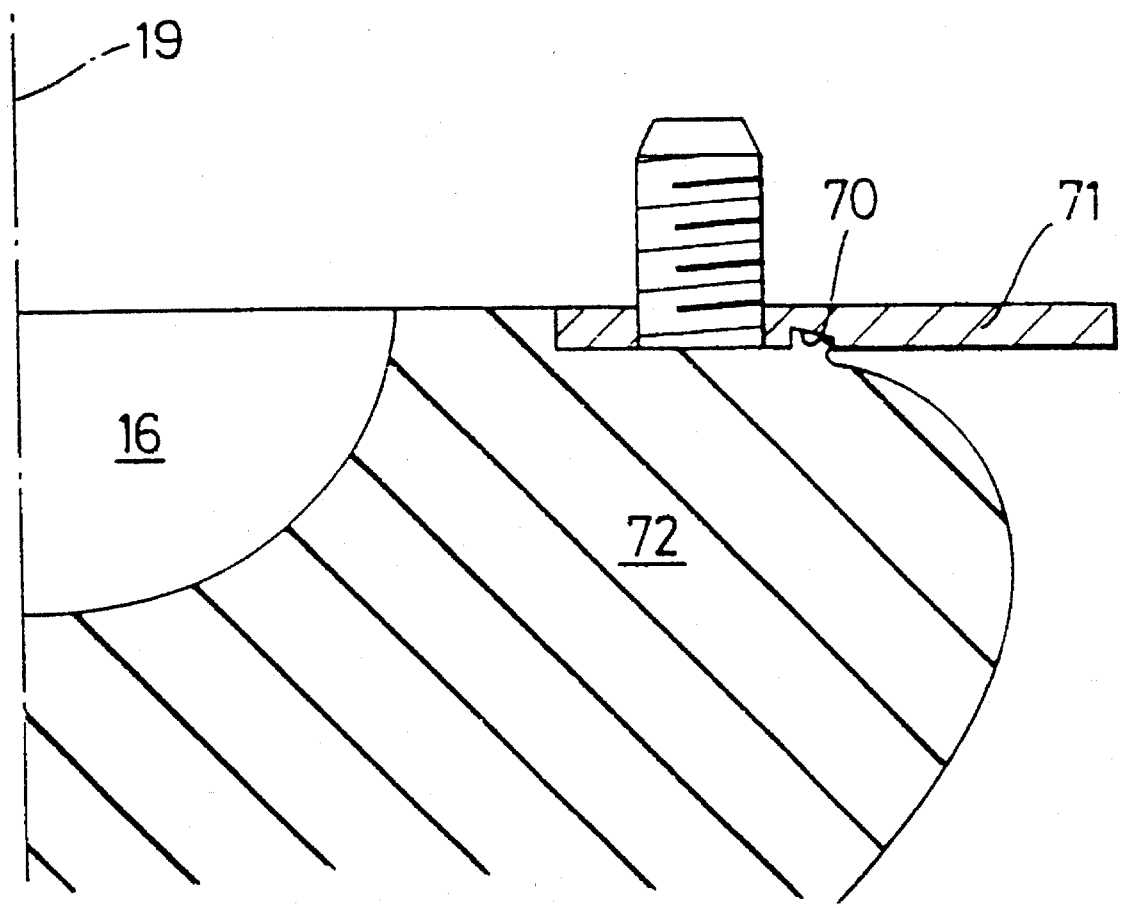

FIG. 7 shows an embodiment having similarities with that of FIG. 4 but in which the two plates 41, 44 of FIG. 4 are of an integral construction, an annular groove 70 being machined in the plate 71 to provide a recess which is occupied by elastomeric material of the body 72.

I claim:

1. An elastomeric mounting comprising a body of elastomeric material having end regions the surfaces of which extend radially outwardly from a longitudinal compression axis of the mounting and are bonded to respective confronting surfaces of a pair of rigid end members to form a bonded interface with each of said rigid end members for compression therebetween, at least a first of said rigid end members extending radially outwardly from said longitudinal compression axis of the mounting to lie beyond the bonded interface, said first rigid end member having outwards of the bonded interface an abutment face which is contacted by the elastomeric body when subject to compression loading, the first rigid end member defining a discontinuity whereby the bonded interface and abutment face are not entirely coplanar, the elastomeric body being substantially hollow at least in the vicinity of a first of said end regions, and the bonded interface at said first rigid end member extending radially outwards further than the bonded interface at the other end of the mounting.

2. An elastomeric mounting according to claim 1 wherein the bonded interface at the first rigid end member is substantially planar.

3. An elastomeric mounting according to claim 2 wherein said discontinuity is provided in the substantially planar bonded interface.

4. An elastomeric mounting according to claim 1 wherein as considered relative to a median plane lying perpendicular to the longitudinal compression axis, midway between the ends of the mounting, at least a part of the elastomeric body at the end region adjacent the first of the rigid end members lies further from said median plane than said abutment face.

5. An elastomeric mounting according to claim 1 in which the discontinuity is provided substantially adjacent to the bonded interface of the first rigid end member.

6. An elastomeric mounting according to claim 1 in which said discontinuity is provided radially outwards of the radially outer extremity of the bonded interface with said first rigid end member.

7. An elastomeric mounting according to claim 1 in which the discontinuity is of a substantially smooth form which is free of sharp edges.

8. An elastomeric mounting according to claim 1 in which the discontinuity comprises a depression in said abutment face.

9. An elastomeric mounting according to claim 1 in which said discontinuity comprises a depression between the abutment face and bonded interface.

10. An elastomeric mounting according to claim 1 in which the discontinuity comprises a raised region whereby at least a part of the abutment region lies axially closer to the other rigid end member of the elastomeric mounting than substantially the whole of the bonded interface.

11. An elastomeric mounting according to claim 1 in which said first rigid end member comprises two or more components.

12. An elastomeric mounting according to claim 11 in which there are two of said components and one of said components comprises a first portion which defines said abutment face and the other of said components comprises a second portion which defines a surface of the bonded interface.

13. An elastomeric mounting according to claim 1 in which said abutment face of the first rigid end member is provided with a coating of low friction and/or resilient material.

14. An elastomeric mounting according to claim 1 in which the elastomeric body is of a kind substantially symmetrical in shape as considered in cross-section about said longitudinal axis, of progressively increasing cross-section through a second part of its length extending from an other end and of a progressively decreasing external cross-section over a first part of its length extending to said first end region.

15. An elastomeric mounting according to claim 14 in which said second part of progressively increasing diameter occupies at least 50%, preferably between 60% and 90%, of the length of the elastomeric body from a second to the first of opposed end regions as considered in said longitudinal direction.

16. An elastomeric mounting according to claim 15 in which the elastomeric body is substantially hollow over between 10 and 80% of its length as considered in said longitudinal direction.

17. An elastomeric mounting according to claim 16 in which the elastomeric body is substantially hollow over between 40 and 70% of the length of said elastomeric body in said longitudinal direction.

18. An elastomeric mounting according to claim 1 with a support structure arranged in series with the elastomeric mounting and wherein said first rigid end member serves at least in part as said structure.

19. An elastomeric mounting according to claim 1 wherein the elastomeric body is substantially solid in the vicinity of a second of said end regions.

20. An elastomeric mounting comprising a body of elastomeric material having end regions the surfaces of which extend radially outwardly from a longitudinal compression axis of the mounting and are bonded to respective confronting surfaces of a pair of rigid end members to form a bonded interface with each of said rigid end members for compression therebetween, at least a first of said rigid end members extending radially outwardly from said longitudinal compression axis of the mounting to lie beyond the bonded interface, said first rigid end member having outwards of the bonded interface an abutment face which is contacted by the elastomeric body when subject to compression loading, the first rigid end member defining a discontinuity whereby the bonded interface and abutment face are not entirely co-planar, the elastomeric body being substantially hollow at least in the vicinity of a first of said rigid end regions, and the bonded interface at said first rigid end member extending radially outwards further than the bonded interface at an other end of the mounting, the elastomeric body being of a kind which is substantially symmetrical in shape as considered in cross-section about said longitudinal axis, and is of progressively increasing cross-section through a second part of its length extending from said other end and of a progressively decreasing external cross-section over a first part of its length extending to said first end region.

\* \* \* \* \*